United States Patent
Kashiwagi et al.

[11] Patent Number: 6,023,451
[45] Date of Patent: Feb. 8, 2000

[54] OPTICAL RECORDING MEDIUM AND OPTICAL DISK APPARATUS

[75] Inventors: Toshiyuki Kashiwagi, Tokyo; Osamu Kawakubo, Saitama; Ariyoshi Nakaoki, Tokyo; Masahiko Kaneko, Kanagawa, all of Japan

[73] Assignee: Sony Corporation, Tokyo, Japan

[21] Appl. No.: 09/046,769

[22] Filed: Mar. 24, 1998

[30] Foreign Application Priority Data

Mar. 25, 1997 [JP] Japan .................. P09-072439
Jul. 10, 1997 [JP] Japan .................. P09-185130

[51] Int. Cl.⁷ ........................................ G11B 7/24
[52] U.S. Cl. ........................ 369/275.5; 369/283
[58] Field of Search .................. 369/275.5, 275.2, 369/13, 14, 283, 284, 275.1; 300/59, 114

[56] References Cited

U.S. PATENT DOCUMENTS

| | | |
|---|---|---|
| 4,175,145 | 11/1979 | Fechter . |
| 4,449,138 | 5/1984 | Ando .................... 346/135.1 |
| 4,957,776 | 9/1990 | Higuchi et al. . |
| 5,186,994 | 2/1993 | Tatewaki et al. . |
| 5,276,674 | 1/1994 | Tanaka .................. 369/275.3 |
| 5,392,263 | 2/1995 | Watanabe et al. .......... 369/13 |
| 5,530,641 | 6/1996 | Kanchira . |
| 5,587,990 | 12/1996 | Watanabe et al. ......... 369/275.2 |
| 5,838,646 | 11/1998 | Watanabe et al. .......... 369/13 |
| 5,838,656 | 11/1998 | Watanabe et al. ......... 369/275.5 |

FOREIGN PATENT DOCUMENTS

| | | |
|---|---|---|
| 0 473 785 | 3/1992 | European Pat. Off. . |
| 0 518 213 | 12/1992 | European Pat. Off. . |
| 0588 305 A2 | 3/1994 | European Pat. Off. . |
| 0 762 405 A2 | 8/1995 | European Pat. Off. . |
| 0 729 141 | 8/1996 | European Pat. Off. . |
| 0 751 508 | 1/1997 | European Pat. Off. . |
| 0 762 405 | 3/1997 | European Pat. Off. . |
| 195 42 022 | 5/1996 | Netherlands . |

OTHER PUBLICATIONS

Patent Abstracts of Japan, vol. 015, No. 281 (P-1228), Jul. 17, 1991 & JP0097134A (Sony Corp.) Apr. 23, 1991.
Patent Abstracts of Japan, vol. 014, No. 409 (P-1101), Sep. 5, 1990 & JP02–158932 (Toshiba Corp.) Jun. 19, 1990.
K. Yamamoto, et al., 0.8–Numerical–Aperture Two–Element Objective Lens for the Optical Disk, Japanese Journal of Applied Physics, vol. 36, No. 1b, Jan. 1997, pp. 456–459, XP002084439, Tokyo.
A. Marchant, Cover Sheet Aberrations in Optical Recording, Proceedings of SPIE, vol. 421, Jun. 8–9, 1983, pp. 43–49, XP002084440, Arlington, Virginia.
A. Marchant, Optical Recording, Addison Wesley, Reading, pp. 125–131, 1992, XP002084441, US.

*Primary Examiner*—Tan Dinh
*Attorney, Agent, or Firm*—Hill & Simpson

[57] ABSTRACT

An optical recording medium according to the present invention includes a base layer having an information signal portion formed on a surface on the side on which laser light is incident, and a light transmissive layer formed on the base layer. A thickness t of the light transmissive layer is within the range of t=3 to 177 $\mu$m at least in an area of the information signal portion. If unevenness of the light transmissive layer is $\Delta t$, N.A. of an optical system for reproduction or recording and reproduction and a wavelength $\lambda$ satisfies $\Delta t \leq \pm 5.26$ $(\lambda/N.A.^4)$ $(\mu m)$. A track pitch is P and a skew is $\Theta$, then $P \leq 0.64$ $\mu$m and $\Theta \leq \pm 84.115°$ $(\lambda/N.A.^3/t)$ are satisfied. The optical recording medium is recorded or reproduced by a recording and reproducing system satisfying $\lambda \leq 0.68$ $\mu$m and $N.A./\lambda \geq 1.20$. The optical recording medium permits a recording capacity of 8 GB.

27 Claims, 9 Drawing Sheets

Unevenness of The Thickness of The Light Transmissive Layer

OPTICAL RECORDING MEDIUM AND OPTICAL DISK APPARATUS

BACKGROUND

1. Field of the Invention

The present invention relates to an optical recording medium having at least one light transmissive layer having an information recording layer and formed on one main surface of a substrate and used for reproducing information by irradiation of reproduction light from a light transmissive layer side.

More particularly, the present invention relates to an optical recording medium which can have a larger capacity by determining a relationship among a thickness of the light transmissive layer, a thickness unevenness, a skew and so on, and an optical disk apparatus for recording or recording and reproducing the optical recording medium.

2. Background of the Invention

An optical recording medium on one side of which an NTSC signal data of four hours amount can be recorded and reproduced has been proposed as that for the next generation. Use of this proposed optical medium allows a home-use video disk recorder to record and reproduce data for four hours, thereby the above optical medium having a function of a new recording medium which can be replaced with a cassette used in a current video cassette recorder (VCR).

Since the above optical recording medium has the same shape and size a compact disc (CD), the above optical recording medium can be a product which prevents even a user who are accustomed to easy handling and operability of the CD from feeling storage.

Moreover, if a fast access which is a most important feature of the above optical recording medium is utilized, it is possible to realize a product which not only serves as a small-sized and easily operable recorder but also has various functions such as video recording, playback, a trick play, edition and so on that can be carried out instantaneously.

Realization of such product requires a storage capacity of 8 GB or larger.

However, there has been no optical recording medium which has a single-layer information recording layer only on one side and can have a storage capacity of 8 GB or larger.

A previously proposed digital versatile disc (DVD) has a storage capacity of 4.7 GB in an area of an information recording portion, i.e., an area ranging from a portion away from a disk center by 24 (mm) to a portion away therefrom by 58 (mm) in a disk radius direction when a wavelength $\lambda$ is 0.65 $\mu$m and a numerical aperture (N.A.) is 0.6.

If a larger storage capacity is desired without any change of a signal format such as an error correction code (ECC), a modulation system and the like, establishment of the following equation (1) is required for realization of a storage capacity of 8 GB or larger.

$$4.7 \times (0.65/0.60 \times N.A./\lambda)^2 \geq 8 \qquad (1)$$

According to the above equation (1), $N.A./\lambda \geq 1.20$ must be established.

Study of this requirement reveals that it is necessary to set the wavelength $\lambda$ shorter or to set N.A. larger.

In order to satisfy the above condition, if the value of N.A. is set larger, it is necessary to decrease a thickness of a light transmissive layer of the optical recording medium through which irradiated reproduction light is transmitted.

The reason for this setting is that an allowance of an angle (tilt angle) at which a disk surface is displaced from a surface perpendicular to an optical axis of an optical pickup becomes smaller. Specifically, the tilt angle is easily affected by optical aberration resulting from a thickness of a base of the optical recording medium.

From similar reason, unevenness of a thickness of the light transmissive layer must be suppressed to a certain value or smaller.

SUMMARY OF THE INVENTION

In view of such aspects, it is an object of the present invention to provide an optical recording medium which permits an especially larger value of N.A. and in which a large amount of information having 8 GB or larger, for example, can be recorded.

According to an aspect of the present invention, an optical recording medium includes a base layer having an information signal portion formed on a surface on the side on which laser light is incident, and a light transmissive layer formed on the base layer. A thickness t of the light transmissive layer is within the range of t=3 to 177 $\mu$m at least in an area of the information signal portion. If unevenness of the light transmissive layer is $\Delta t$, N.A. of an optical system for reproduction or recording and reproduction and a wavelength $\lambda$ satisfies $\Delta t \leq \pm 5.26 \, (\lambda/N.A.^4) \, (\mu m)$. A track pitch is P and a skew is $\Theta$, then $P \leq 0.64 \, \mu m$ and $\Theta \leq \pm 84.115° \, (\lambda/N.A.^3/t)$ are satisfied. The optical recording medium is recorded or reproduced by a recording and reproducing system satisfying $\lambda \leq 0.68 \, \mu m$ and $N.A./\lambda \geq 1.20$. The optical recording medium permits a recording capacity of 8 GB.

DESCRIPTION OF THE PREFERRED EMBODIMENTS

Figure 1:
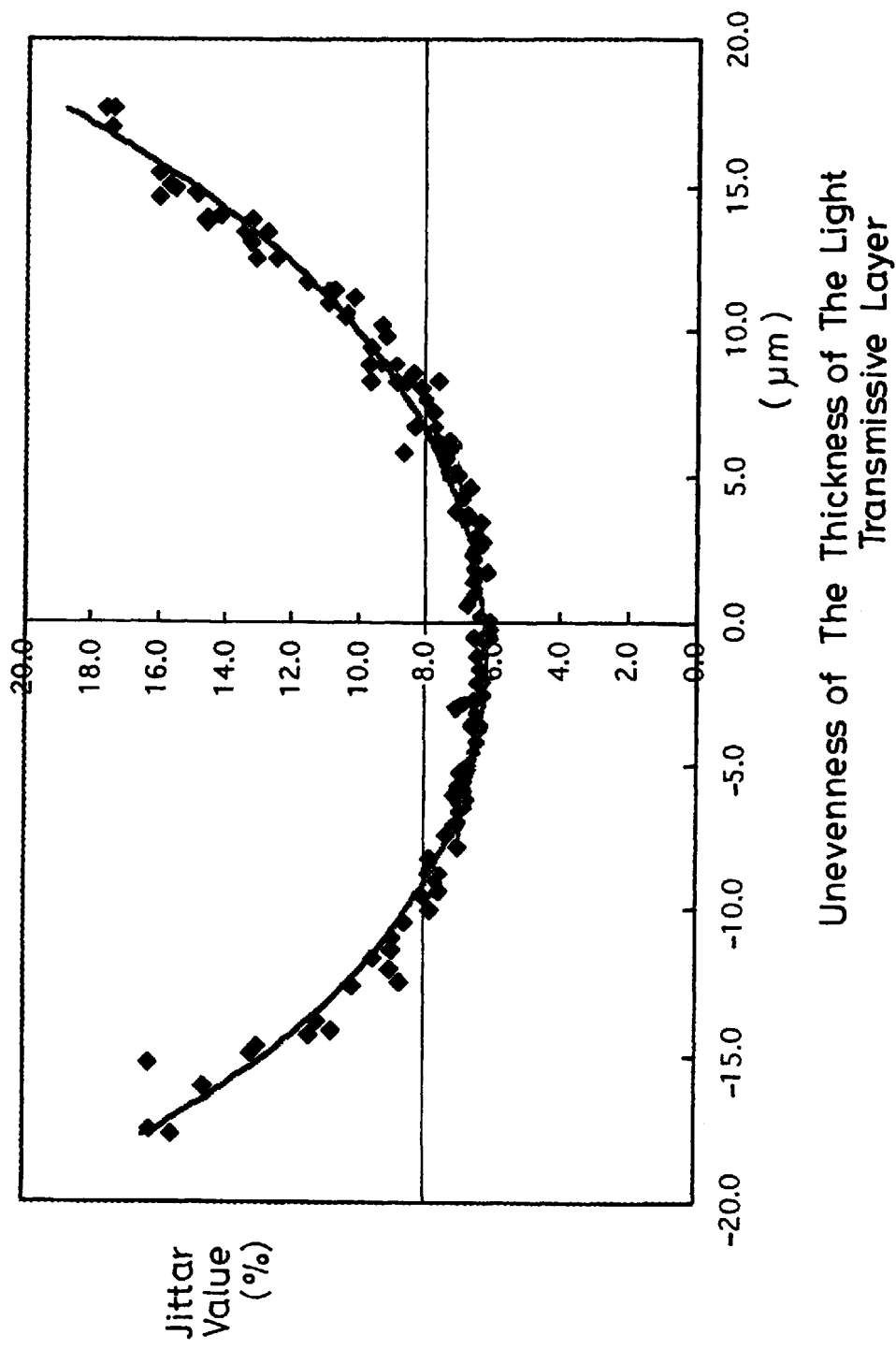
FIG. 1 is a graph showing an experimental data concerning change of a jitter value relative to unevennss of a light transmissivee layer.

An optical disk according to an embodiment of the present invention will hereinafter be described in detail with reference to the accompanying drawings.

In this embodiment, the present invention is applied to an optical disk in which a signal is read out by irradiating laser light transmitted through a light transmissive layer on a base layer, e.g., a substrate having the information recording layer.

In a general optical recording disk, a disk skew margin $\Theta$, a value of N.A. and a thickness t of a light transmissive layer have correlation with one another. Japanese patent publication No. H3-225650 discloses a relationship between these parameters and the margin $\Theta$ with reference to that of the CD whose practical playability is sufficiently proved.

According to the above publication, it is sufficient to establish the following equation (2).

$$\Theta \leq \pm 84.115 \ (\lambda/N.A.^3/t) \tag{2}$$

This criterion can be applied to the optical recording medium according to the present invention.

A specific limit value of skew margin $\Theta$ required when an optical disk is mass-produced is properly set to 0.4°. The reason for this is that in view of mass production of the optical disk, if the limit value is set smaller than the above value, a yield of the optical disks is lowered and consequently manufacturing costs thereof is increased. In existing recording media, the limit value of the skew margin $\Theta$ of the CD is 0.6° and that of the DVD is 0.4°.

Accordingly, a thickness of the light transmissive layer to be set is calculated on the assumption that a wavelength of a laser light is set shorter and a value of N.A. is set larger under the condition of $\Theta=0.4°$. If $\lambda=0.65$ $\mu$m is set, then the value of N.A. must be set to 0.78 or larger. This leads to $t \leq 288$ $\mu$m.

If a wavelength of laser light further becomes shorter and then $\lambda=0.4$ $\mu$m is set, then the thickness t of the light transmissive layer is set as $t \leq 177$ $\mu$m on the assumption that N.A.$\leq 0.78$ is not varied. In this case, if an existing equipment for manufacturing a CD and the like having a substrate with a thickness of 1.2 mm is utilized, then a thickness of the whole optical disk is about 1.38 mm at maximum.

In consideration of a magnetic field modulation employed in a magneto-optical disk, it is preferable to reduce the thickness of the light transmissive layer. If the thickness is set to 30 $\mu$m or smaller, it becomes easy to record and reproduce the magneto-optical disk.

A lower limit of the thickness of the light transmissive layer is determined depending upon a protection function of the light transmissive layer for protecting a recording film or a reflective film. The lower limit of the thickness is desirably set to 3 $\mu$m or larger in consideration of reliability of the optical recording medium and influence of collision of a two-group lens described later on to a surface of the light transmissive layer.

As described above, increase of a value of N.A./$\lambda$ is indispensable for increase of a storage capacity of the optical recording medium. In this case, in order to achieve a storage capacity of 8 GB, it is necessary at least to set the value of N.A. to 0.7 or larger and set the wavelength $\lambda$ of the laser light to 0.68 or smaller. While there is the above relationship between the thickness of the light transmissive layer and the skew, the thickness t of the light transmissive layer is properly set within the range from 3 to 177 $\mu$m in order to allow use with a laser ranging from an existing red laser to a blue laser which is expected to prevail in future.

A track pitch P and a linear density d must be changed for achievement of a larger recording capacity (8 GB) which is an object of the present invention. A necessary condition therefor is to satisfy the following equations (3).

$$(0.74/P) \times (0.267/d) \geq 8 \quad d \leq 0.1161/P \ (\mu m/bit) \tag{3}$$

When P=0.58 $\mu$m, an equation of $d \leq 0.206$ $\mu$m/bit is established. This example is calculated with reference to the values of a DVD-ROM (read-only memory). Therefore, in consideration of progress of a signal processing technique for recording and reproduction (i.e., application of partial response maximum likelihood (PRML), decrease of redundancy of the ECC and the like), it is expected that the linear density is increased by 15%, and hence it is possible to increase the track pitch P to that extent. This reveals that the track pitch P is 0.64 $\mu$m at maximum.

Moreover, a tolerance for fluctuation $\Delta$P of the track pitch is strictly set. If the optical disk has the same recording and reproduction parameters of the CD or the DVD, then the following equation (4) is obtained from a track pitch of 0.74 and a tolerance of $\pm 0.03$ employed in the DVD.

$$\Delta P \leq \pm 0.03 P/0.74 = \pm 0.04 \ P \tag{4}$$

Accordingly, if P=0.56 is established, then $\Delta P \leq \pm 0.023$ $\mu$m is established.

Moreover, unevenness of the thickness of the light transmissive layer must be improved more accurately.

If the thickness of the light transmissive layer is displaced from a center value based on which a reproduction objective lens is designed, an amount of aberration resulting from influence of the uneven thickness on a spot is in proportion to a biquadrate of the value of N.A. and the wavelength. Accordingly, if it is desired to increase the recording density by setting the value of N.A. larger and setting the wavelength shorter, then the unevenness of the thickness of the light transmissive layer is suppressed more strictly. The CD which is a specific system example is practically used with N.A.=0.45 being established and with a standard tolerance for the uneven thickness of the light transmissive layer being ±100 μm.

The DVD has N.A.=0.6 and a standard tolerance of the uneven thickness of ±30 μm. If the allowance amount of ±100 μm in the CD is employed as reference, then the unevenness Δt of the thickness is expressed by the following equation (5).

$$\Delta t = \pm(0.45/N.A.)^4 \times (\lambda/0.78) \times 100 = \pm 5.26 \times (\lambda/N.A.^4) \mu m$$

(where N.A. represents a numerical aperture)  (5)

FIG. 1 shows experimental results of a relationship between the unevenness of the thickness of the light transmissive layer and a jitter value obtained when a center value of the thickness of the light transmissive layer is 100 μm and when the wavelength is 0.68 μm and the value of N.A. is N.A.=0.875.

Study of FIG. 1 reveals that when the jitter value is 8% which is a jitter reference obtained when no fluctuation resulting from a skew or the like occurs, the unevenness of the thickness of the light transmissive layer at this time is about ±7 μm. A value obtained from the equation (5) is 6 μm. This means that a satisfactory signal can be obtained from a disk medium satisfying the above standard.

Therefore, the allowance for the unevenness Δt of the thickness of the light transmissive layer must be set within the range of $\pm 5.26 \times (\lambda/N.A.^4)$.

Since the thickness of the light transmissive layer is made on the assumption that it is even in an optical disk surface irradiated with a recording and reproduction laser, it is possible to correct the aberration by displacing a focus point thereof. However, if the thickness of the light transmissive layer is uneven in this irradiation area (i.e., in the spot), it is impossible to correct the aberration by adjusting the focus point. This unevenness Δt must be suppressed to ±3λ/100 or smaller with respect to a center value of the thickness.

Moreover, an eccentricity E of the optical recording disk is set as shown in the following equation (6) while that of the DVD is 50 μm.

$$E \leq 50 \times P/0.74 = 67.57P \; (\mu m)$$  (6)

As described above, a summary of the conditions required for the optical recording medium to achieve a high density allowing a storage capacity of 8 GB is as follows.

A recording and reproducing optical system satisfies $\lambda \leq 0.68$ μm and $N.A./\lambda \geq 1.20$. The optical recording medium has a light transmissive layer having, at lease in the area of the information signal portion, a thickness t=3 to 177 μm and the thickness unevenness $\Delta t \leq \pm 5.26 \; (\lambda/N.A.^4) \; (\mu m)$., and also has the track pitch $P \leq 0.64$ μm, the tolerance $\Delta P \leq \pm 0.04$ Pμm, the linear density $d \leq 0.1161/P$ (μm/bit), the disc skew (bend) $\theta \leq 84.115 \times (\lambda/N.A.^3/t)$, the eccentricity $E \leq 67.75P$ (μm), and a surface roughness $Ra \leq \pm 3\lambda/100$ (in the spot irradiation area).

A substrate is formed by injection molding employing a stamper which realizes a pitch and pitch fluctuation that satisfies the above-mentioned specifications required for the optical recording medium according to the present invention. Since it is difficult to manufacture such high-accuracy stamper with less pitch fluctuation by a conventional machine carrying out a feeding operation by using a screw, the above stamper is manufactured by an original disk exposing device having a feeding structure with a linear motor. Moreover, an optical system is covered with a cover for eliminating movement of air, and has a vibroisolating material provided between a laser and an exposing device for removing vibration of cooling water for an exposure laser.

In this embodiment, since the reflective film or the recording film is formed on an information signal surface of the substrate and the information is recorded and reproduced by irradiation of light thereon, a pit must be formed on the substrate in consideration of deformation of a recorded signal when the films are formed.

For example, if asymmetry of a signal pit of a ROM type disk having a storage capacity of 10 GB is 25% when the signal pit is seen from the substrate (base) side, then the asymmetry of the signal pit seen from the side opposite to the base side is 10%. Specifically, since the signal is read out from the side of the light transmissive layer which is a side opposite to the base side, the asymmetry of the pit must be set to 25% when the substrate is formed, in order to form the pit having the asymmetry of 10% when the pit is seen from the light irradiation side.

Similarly, when information is recorded on and reproduced from a groove (i.e., a concave portion on a recording and reproduction surface) formed on a recording disk, since a groove duty ratio is changed, i.e., the guide groove becomes narrower after the recording film is formed, for example, a shape of a stamper must be arranged so that a wider groove should be formed. For example, when information is recorded on both of a land and a groove, a duty ratio of widths of the land and the groove measured on the light irradiation side is preferably set to 55 to 65% in order to obtain a final duty ratio of 50%.

Since certain rigidity is required if a disk is formed of a single plate, it is desirable that the substrate of the optical recording medium according to the present invention has a thickness of about 0.6 mm or larger. If the optical recording medium having two substrates bonded to each other as described above is manufactured, it is proper to set the thickness of the substrate to about 0.3 mm.

Figure 2:
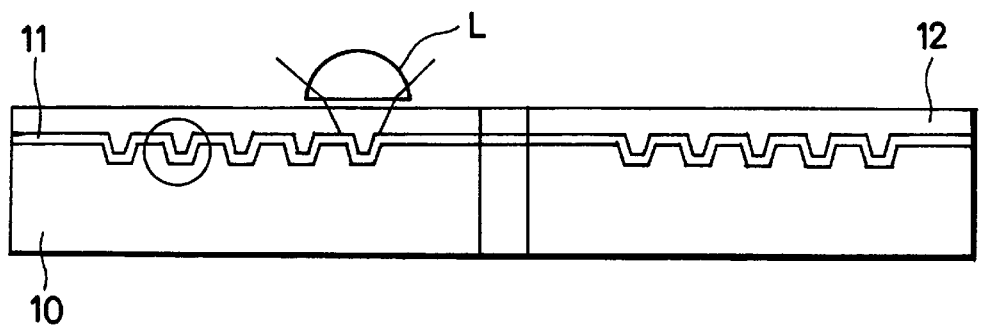
FIG. 2 is a schematic, cross-sectional view showing an example of an optical recording medium according to the present invention.

As shown in FIG. 2, a recording film or a reflective film is formed on an information signal portion 11 of a substrate 10. If the disk is of ROM type, the reflective film made of Al or the like is formed so as to have a thickness of 20 to 60 nm.

If the disk is of phase-change type, the information recording film is formed by successively forming an Al film, a GeSbTe film and a ZnS—SiO₂ film in this order.

If the disk is the magneto-optical disk, the information recording film is formed by successively forming an Al film, a SiN film, a TbFeCo film and a SiN film in this order.

If the disk is of write-once type, the information recording film is formed by sputtering Au or Al and then coating a cyanin system or phthalocyanine system organic pigment film to dry it.

As shown in FIG. 2, recording and reproduction light is irradiated from a recording and reproduction objective lens L from a side opposite to the substrate 10.

Figure 3:
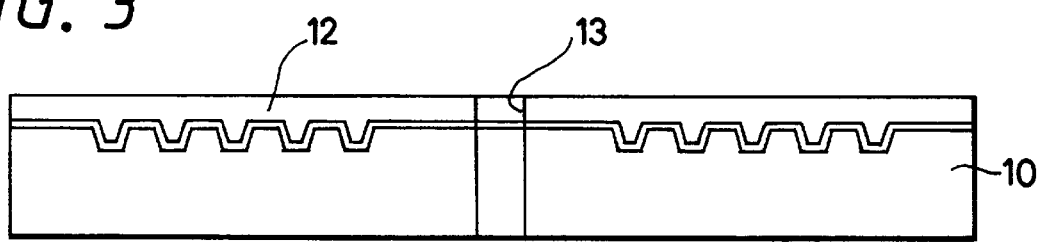
FIG. 3 is a schematic, cross-sectional view showing an example of an optical recording medium according to the present invention.

As shown in FIG. 3, a light transmissive layer 12 is further formed of ultraviolet curing resin on the information recording film. For example, the light transmissive layer 12 can be formed by rotation-drawing the dropped ultraviolet curing resin on a surface, on which films having any of the above structures are to be formed, of the substrate 10 to cure the same by irradiation of light.

It is proper for the ultraviolet resin to have viscosity ranging from 300 cps to 30000 cps, in view of forming the light transmissive layer 12 having the above thickness.

For example, if the ultraviolet curing resin having viscosity of 5800 cps at 25° C. is employed, the ultraviolet curing resin is dropped on the substrate and the substrate is rotated for eleven seconds at a speed of 2000 rpm. Then, the light transmissive layer 12 having a thickness of 100 μm can finally be formed.

When the light transmissive layer 12 is formed by using the liquid ultraviolet curing resin if the liquid ultraviolet resin is dropped at an inner periphery portion of the substrate 10, e.g., at a position away from a disk center by 25 mm in the radius direction and then rotation-drawn, the thickness at the inner periphery becomes different from that at the outer periphery due to a relationship between centrifugal force and viscous resistance. The difference amounts to 30 μm or larger, and hence cannot satisfy the above-mentioned tolerance of the thickness.

In order to avoid this disadvantage, it is effective that, in a state that a center aperture 13 of the substrate is buried by some means, the ultraviolet curing resin is dropped at the center portion of the substrate 10. For example, the polycarbonate sheet having a thickness of 0.1 mm is processed so as to have a circular shape with a diameter φ of 30 nm and bonded to the center aperture 10h. Then, the ultraviolet curing resin is dropped and then cured by irradiation of ultraviolet rays, and that thereafter the center aperture is punched again. According to this method, it is possible to achieve the light transmissive layer 12 having a difference between thicknesses thereof at the inner and outer peripheries suppressed to 10 μm (p-p) or smaller.

When the light transmissive layer 12 is formed, in order to prevent the light transmissive layer 12 from being projected from the outermost periphery of the optical disk, it is desirable to set a value of 120 mm+7 mm as a maximum value of a diameter of the optical disk with reference to a diameter 120 mm of the CD and the like.

Figure 4:
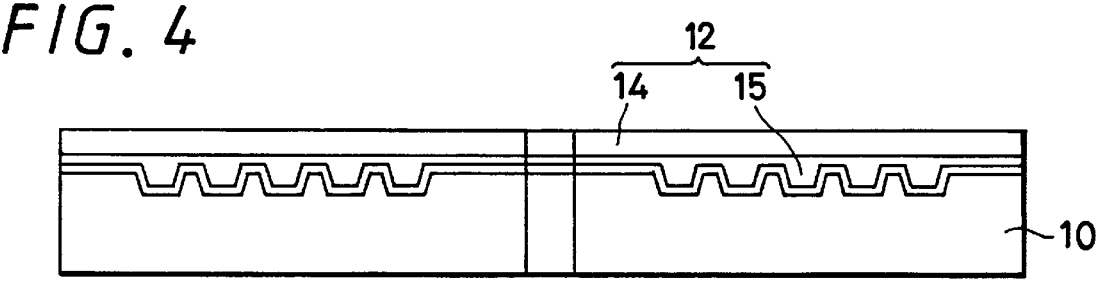
FIG. 4 is a schematic, cross-sectional view showing another example of an optical recording medium according to the present invention.

As shown in FIG. 4, the light transmissive layer 12 may be formed by bonding the polycarbonate sheet 14 with a thickness of 100 μm, for example by the ultraviolet curing resin 15. In this case, it is required that a sum of unevenness of thickness of the sheet 14 and unevenness of a thickness of the bonding ultraviolet curing resin 15 is set to 10 μm p-p or smaller.

The sheet 14 having the same diameter as that of the substrate 10 is disposed on the substrate 10 through the bonding ultraviolet curing resin 15 and the ultraviolet curing resin 15 is rotation-drawn with employing the sheet 14 as a weight for the ultraviolet curing resin 15. As a result, an extremely thin ultraviolet curing resin layer is formed. Thus, the total unevenness of the thickness thereof can be totally suppressed to 10 μm p-p.

Figure 5:
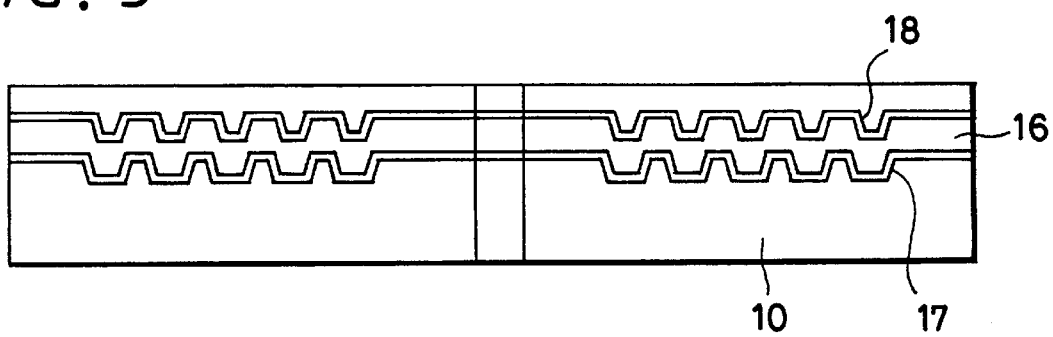
FIG. 5 is a schematic, cross-sectional view showing another example of an optical recording medium according to the present invention.

The present invention can be applied to an optical recording medium having a multilayer structure in which, as shown in FIG. 5, a second recording layer 18 is formed through an intermediate layer 16 on a first recording layer 17 formed on a substrate 10.

Figure 6:
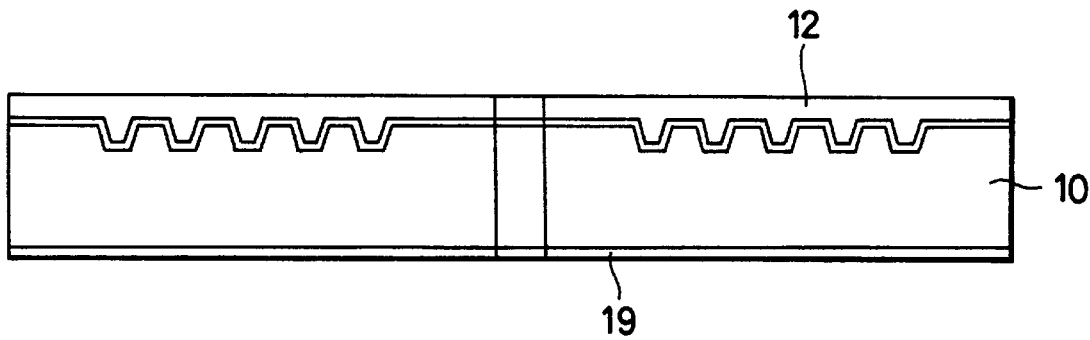
FIG. 6 is a schematic, cross-sectional view showing another example of an optical recording medium according to the present invention.

A skew tends to easily occur in the optical disks having the above structures. As shown in FIG. 6, in order to reduce the skew, it is effective that ultraviolet curing resin may be coated as a skew correction member 19 on a surface of the substrate 10 opposite to a surface where the light transmissive layer 12 is formed.

The skew correction member 19 may be formed by coating the same material as that of the light transmissive layer 12 or thinly coating a material having a higher ratio of shrinkage after curing as compared with the material of the light transmissive layer 12.

In order to record and reproduce a high recording density optical recording medium, an optical pickup having an objective lens with high N.A. described later on is required. In this case, a distance (hereinafter referred to as a working distance (W.D.)) between the objective lens and the light transmissive layer surface must be set narrower as compared with a distance employed in an ordinary pickup.

However, in this case, the objective lens may collide with the light transmissive layer surface and hence damage it.

Figure 7:
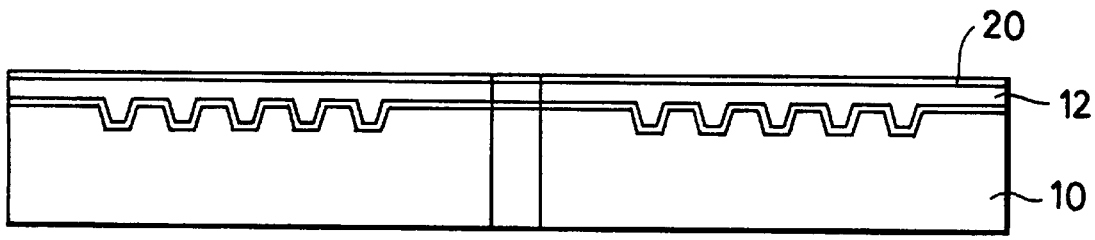
FIG. 7 is a schematic, cross-sectional view showing another example of an optical recording medium according to the present invention.

In order to prevent this damage resulting from the collision, as shown in FIG. 7, it is effective to provide a hard coat 20 (having hardness higher than a pencil hardness H.)

If the light transmissive layer 12 is made thinner, it tends to easily receive harmful influence from dusts. Therefore, the hard coat 20 may have an antistatic function. This antistatic function can prevents dusts from being absorbed on a surface of the optical disk.

If a wavelength of light to be measured is 780 nm, it is preferable that an amount of birefringence in a light transmissive layer of the optical disk according to the present invention is 15 nm or smaller on average when the light passes therethrough from and toward an outside and fluctuation of the birefringence amount thereof among positions in the radius direction of the optical disk is 15 nm p-p (peak to peak) or smaller.

Figure 23:
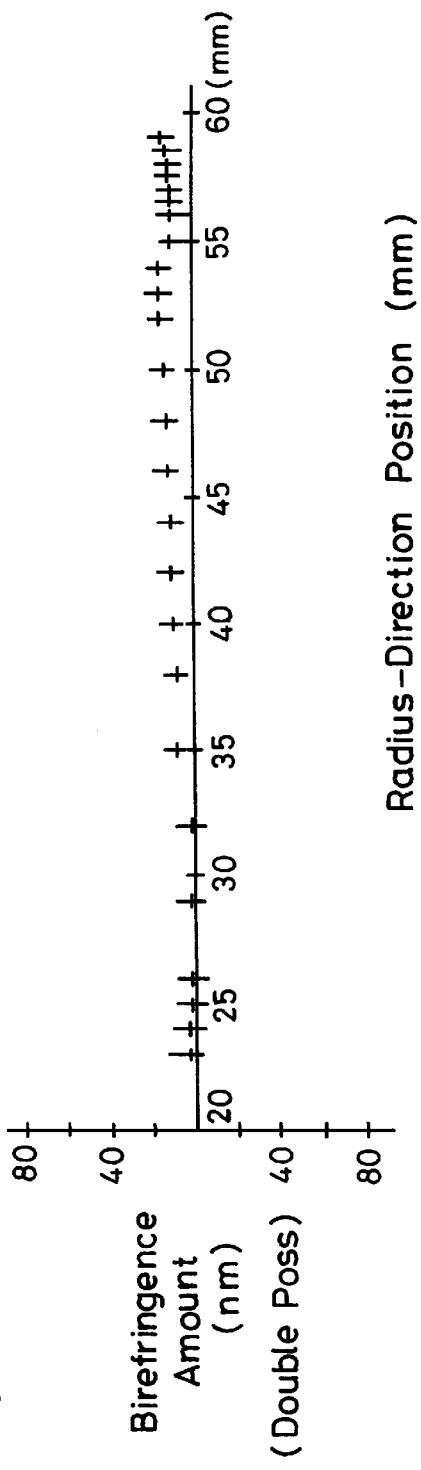
FIG. 23 is a graph showing results of a measured amount of birefringence in a light transmissive layer of an optical disk according to the present invention.

A signal was experimentally recorded and reproduced by using the optical disk according to the present invention having the light transmissive layer formed by using a polycarbonate sheet with a thickness of 100 μm and a phase-change film as the information recording layer. In this case, a jitter value of 8% was obtained when a linear density is 0.21 μm/bit. An amount of birefringence of the above optical disk was measured. FIG. 23 shows results of the measurement. In FIG. 23, an abscissa represents a radius-direction position (mm), and an ordinate represents an amount of birefringence (nm). In FIG. 23, distribution of the birefringence amount is represented by an ordinate direction segment, and a mean value is represented by a cross point of the ordinate-direction segment and an abscissa-direction segment. The amount of birefringence can be set to 15 nm or smaller on average when the light passes therethrough from and toward an outside and fluctuation of the birefringence amount thereof among positions in the radius direction of the optical disk can be set to 15 nm p-p (peak to peak) or smaller.

The similar experimental recording and reproduction operation was carried out by using the optical disk according to the present invention formed by coating liquid light curing resin on the information recording layer as the phase-change film and rotational-drawing the resin to cure the same by light irradiation.

Figure 24:
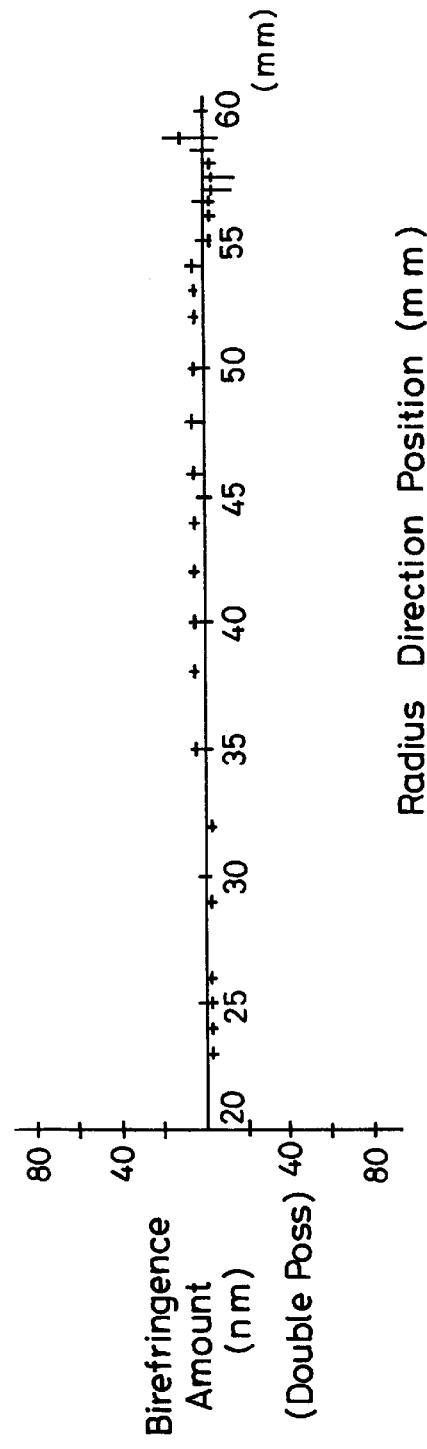
FIG. 24 is a graph showing results of a measured amount of birefringence in a light transmissive layer of an optical disk according to the present invention.

In this case, a jitter value of 7% was obtained when a linear density is 0.21 μm/bit. An amount of birefringence of the above optical disk was measured. FIG. 24 shows results of the measurement. In FIG. 24, an abscissa represents a radius-direction position (mm), and an ordinate represents an amount of birefringence (nm). In FIG. 24, distribution of the birefringence amount is represented by an ordinate direction segment, and a mean value is represented by a cross point of the ordinate-direction segment and an abscissa-direction segment. The amount of birefringence can be further reduced as compared with that obtained when the light transmissive layer is formed of a polycarbonate sheet, i.e., can be set to 5 nm or smaller on average when the light passes therethrough from and toward an outside and fluctuation of the birefringence amount thereof among positions in the radius direction of the optical disk can be set to 5 nm p-p (peak to peak) or smaller.

As described above, comparison with the conventional CD and DVD having birefringence amount in the surface of 100 nm reveals that the optical disk according to the present invention has stable and excellent characteristics.

If a silane processing is subjected to a surface of the information recording layer of the optical recording medium according to the present invention, then it is possible to improve tight adhesion between the information recording layer and the ultraviolet curing resin forming the light transmissive layer.

The optical recording medium according to the present invention may have an antireflection film formed on a surface of the light transmissive layer by sputtering, for example.

Refractivity N of the antireflection film is desirably set lower than refractivity of the light transmissive layer. If a wavelength of light used for recording and reproduction is $\lambda$, then a thickness of the antireflection film is desirably set to $(\lambda/3)/N$ (nm) or smaller, preferably to $(\lambda/4)/N$ (nm) or smaller.

As a value of N.A. becomes higher as is encountered by the optical recording medium according to the present invention, an incident angle of recording and reproduction light becomes larger, which prevents reflection of light on a surface of the light transmissive layer from being disregarded.

For example, in case of N.A.=0.45, the incident angle of the recording and reproduction light is 26.7°, and in case of N.A.=0.6, the incident angle of the recording and reproduction light is 36.9°.

In case of N.A.=0.8, the incident angle of the recording and reproduction light is 53.1°.

It has been confirmed that the reflectivity of the light on the surface of the light transmissive layer depends upon the incident angle of the recording and reproduction light. If the refractivity of the light transmissive layer is 1.52, then the surface reflectivity of an S polarized component exceeds 15% (see P168 of "Guide for Laser and Optics" published by Kino Melles Griot Co. ). In this case, a problem of loss of light amount is caused and an effective N.A. is lowered.

In order to avoid the above problems, it is effective to form an antireflection film.

It has been known that if the refractivity of the light transmissive layer is 1.52, then use of a material for the antireflection film having an optical refractivity of about 1.23 is ideal (see P28 "Optical Thin Film" in Optical Technology Series Vol. 11 published by Kyoritsu publishing Co.). In an industrial field, $MgF_2$ having refractivity N of 1.38 is used.

If a wavelength of the recording and reproduction light is 650 nm, substitution of respective values for variables of a term of $(\lambda/4)/N$ (nm) reveals that the antireflection film is preferably formed so as to have a thickness of about 120 nm.

It is confirmed that if an amount of reflection of light on a surface of the light transmissive layer is reduced in the range from 0 to $(\lambda/4)/N$ (nm), then the amount becomes minimum when it is $(\lambda/4)/N$ (nm). It is confirmed that on the other hand, if the thickness of the antireflection film exceeds $(\lambda/4)/N$ (nm), then the amount of reflection of light is increased and becomes maximum when $(\lambda/2)/N$ (nm). Based on these facts and in consideration of an industrial film forming technique, it is confirmed that it is practically sufficient to set the thickness of the antireflection film to $(\lambda/3)/N$ (nm) or smaller.

When the antireflection film is formed of the surface of the light transmissive layer as described above, e.g., a single-layer $MgF_2$ film with a thickness of $(\lambda/4)/N$ (nm) is formed as the antireflection film on the light transmissive layer having refractivity of 1.52, if the recording and reproduction light having the wavelength of 550 nm is used, then it is possible to reduce light amount thereof by 50% or more when the incident angle of the recording and reproduction light is increased up to about 60° (see P174 "Guide for Laser and Optics" published by Kino Melles Griot Co.).

Figure 8:
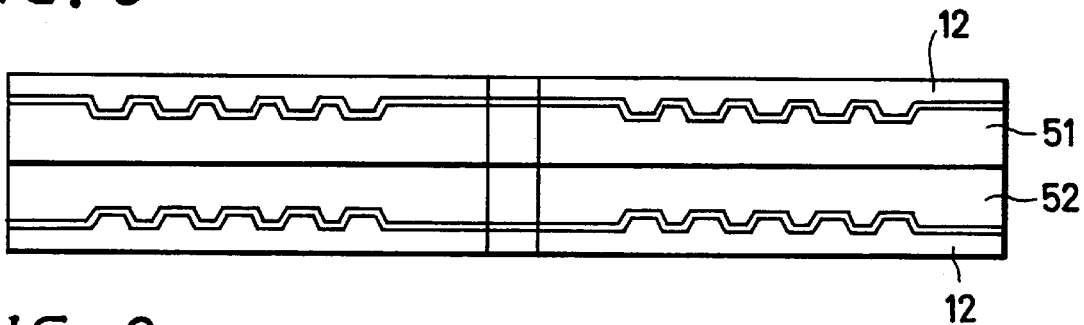
FIG. 8 is a schematic, cross-sectional view showing another example of an optical recording medium according to the present invention.
Figure 9:
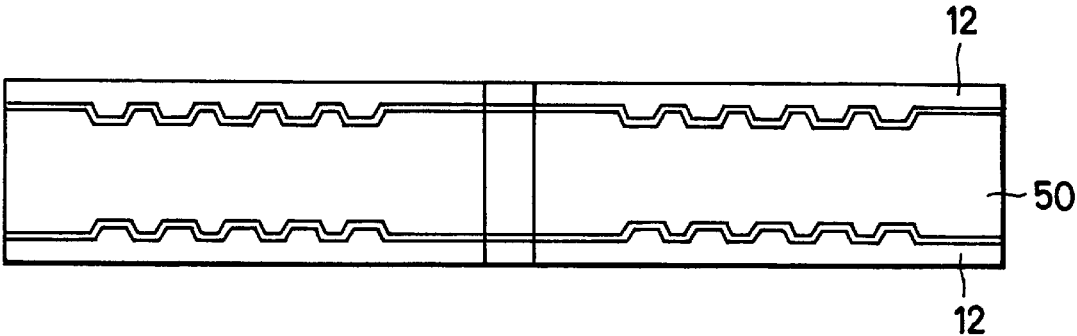
FIG. 9 is a schematic, cross-sectional view showing another example of an optical recording medium according to the present invention.

The optical disk according to the present invention may have a structure shown in FIG. 8 in which two substrate 51, 52 each having a thickness which is half of thickness of the substrate 10 finally obtained are bonded to each other. In this case, since the two substrates 51, 52 each having a thickness of 0.6 mm have light transmissive layers each having thickness of 170 μm at maximum and formed thereon are bonded to each other, a thickness of the disk becomes (0.6+0.17)×2+(thickness of bonding layer). If the thickness of a bonding layer is 0.06 mm, then the disk thickness is 1.60 mm. As shown in FIG. 9, the optical disk may have information signal recording surface and light transmissive layers formed on both surfaces of one substrate 50.

A method of manufacturing an optical recording medium according to the present invention will be described.

Figure 10:
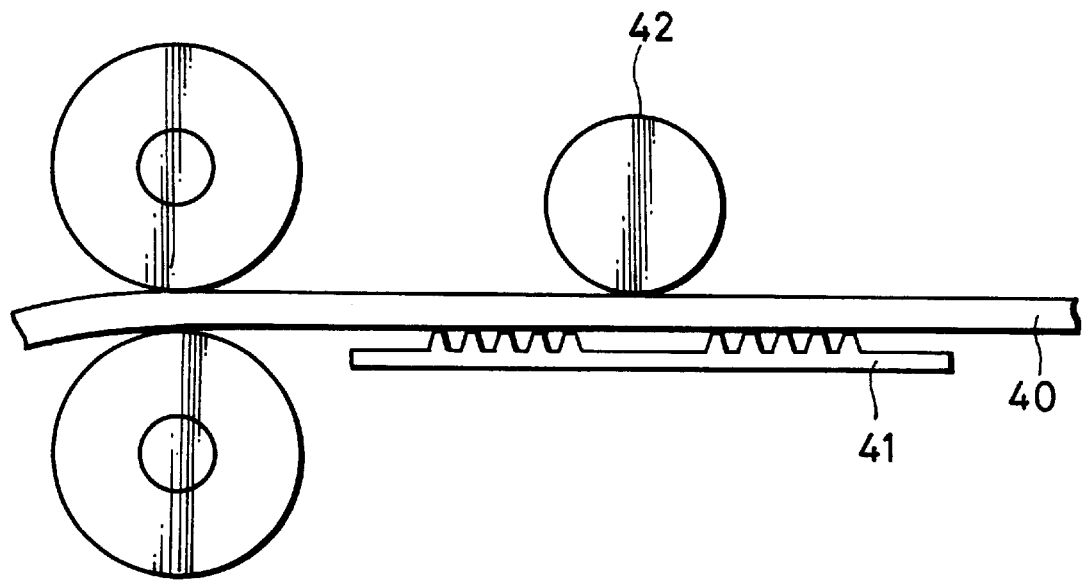
FIG. 10 is a diagram showing a process for manufacturing an optical disk according to the present invention.

As shown in FIG. 10, a polycarbonate sheet 40 having a thickness of 100 μm manufactured by extrusion or casting is prepared. A stamper 41 heated to a temperature higher than a glass transition point and a roller 42 are pressed to the sheet 40 with a pressure. In this case, the pressure can be set to 280 Kgf, for example.

Figure 11:
FIG. 11 is a schematic, cross-sectional view of a thin plate substrate forming an example a multilayer optical disk according to the present invention.

After the above operation, as shown in FIG. 11, pits or guide grooves of the stamper 41 are transferred are transferred to the sheet 40. After being cooled, the sheet 40 is peeled off from the stamper 41, thereby a thin plate substrate 43 having a thickness of 100 μm being formed.

Subsequently, the reflective film or the recording layer are formed on the guide groove by a process similar to the above-mentioned manufacturing method.

An optical recording medium having a multiplier structure can be manufactured by using the thin plate substrate 43 shown in FIG. 11.

Figure 12:
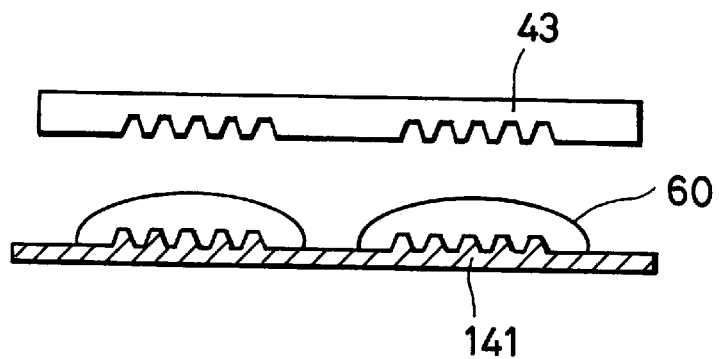
FIG. 12 is a diagram showing a process for manufacturing an example of a multilayer optical disk according to the present invention.

In this case, as shown in FIG. 12, liquid ultraviolet curing resin 60 is dropped on a stamper 141, and the thin plate substrate 43 shown in FIG. 11 is disposed on the liquid ultraviolet curing resin 60 with its recording layer side being in contact therewith.

Figure 13:
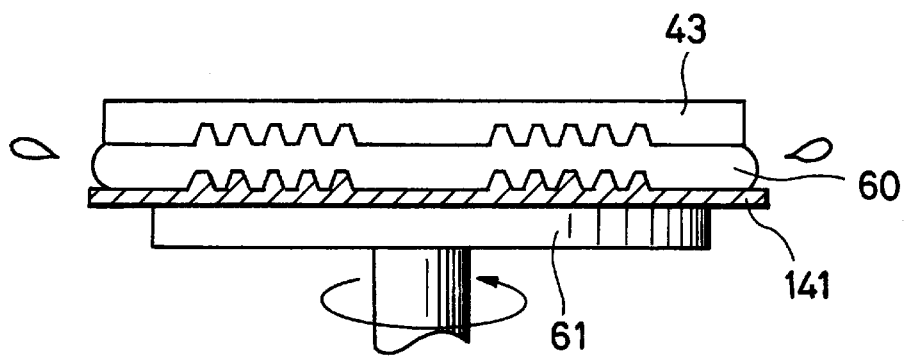
FIG. 13 is a diagram showing a process for manufacturing an example of a multilayer optical disk according to the present invention.
Figure 14:
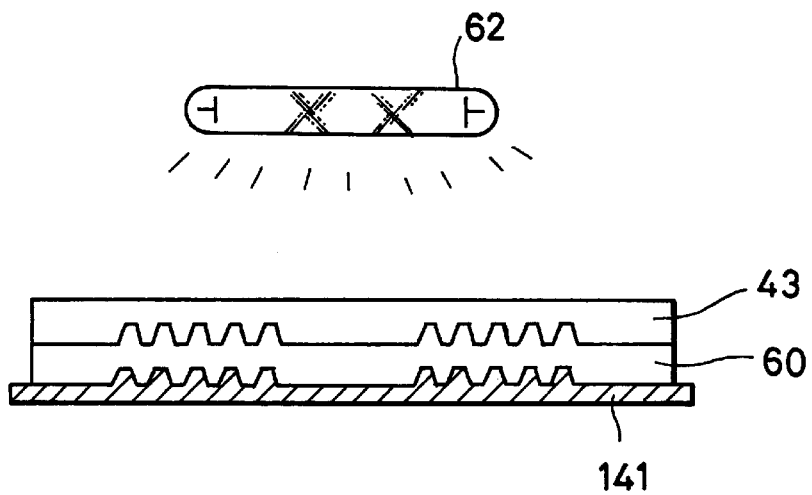
FIG. 14 is a diagram showing a process for manufacturing an example of a multilayer optical disk according to the present invention.

As shown in FIG. 13, in a state the thin plate substrate is disposed on a rotation mount 61 through the liquid ultraviolet curing resin 60, the stamper 141 on which the thin plate substrate is laminated is rotated to draw the liquid ultraviolet curing resin, thereby a desired thickness of the ultraviolet curing resin being set to 20 μm, for example. Thereafter, as shown in FIG. 14, ultraviolet rays are irradiated from a lamp 62 from a side of the thin plate substrate 43, thereby the liquid ultraviolet curing resin 60 being cured.

Figure 15:
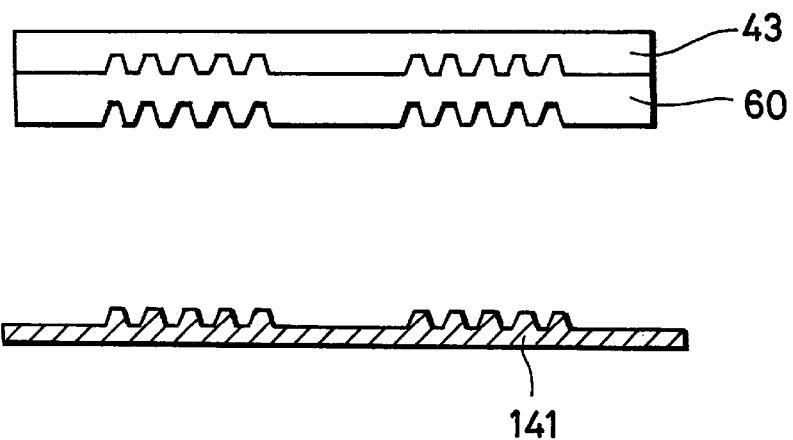
FIG. 15 is a diagram showing a process for manufacturing an example an optical disk according to the present invention.

As shown in FIG. 15, the thin plate substrate 43 and the cured ultraviolet curing resin 60 having a thickness of 20 μm are integrally peeled off from the stamper 141.

A metal thin film made of Si compound, Al, Au or the like is formed on a minute concave and convex thus transferred to the ultraviolet curing resin 60 by the stamper 141, and hence the recording layer can be formed.

An optical disk having three recording layers or more can be manufactured by repeatedly carrying out the process described with reference to FIGS. 12 to 15.

Figure 16:
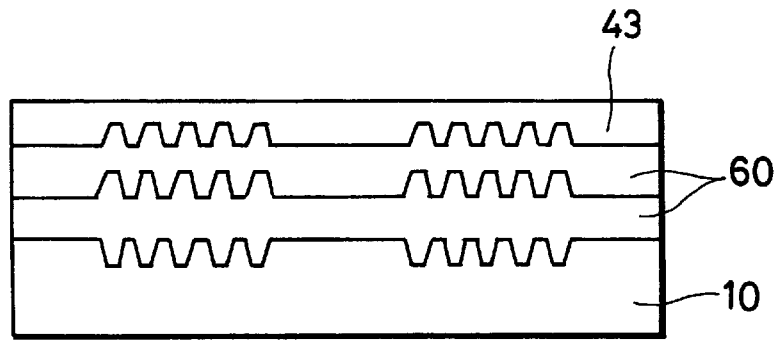
FIG. 16 is a schematic, cross-sectional view showing an example of an optical recording medium according to the present invention.

As shown in FIG. 16, the substrate obtained by injection molding is bonded to the recording layer finally obtained as described above through a ultraviolet curing resin at an interval of 20 µm. Thus, an optical disk having high rigidity can be obtained.

Figure 17:
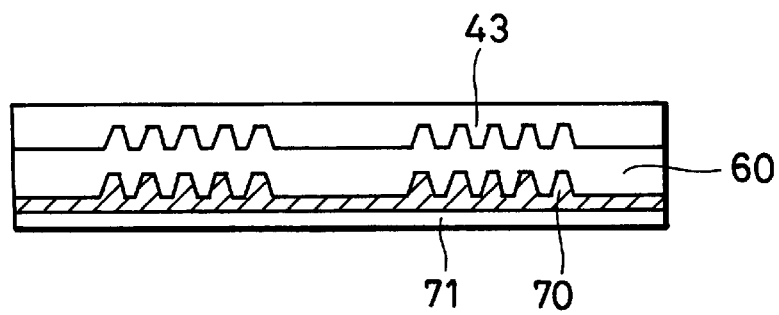
FIG. 17 is a schematic, cross-sectional view showing an example of an optical recording medium according to the present invention.

As shown in FIG. 17, a high-reflection film 70 made of Al, Au or the like is formed on the finally obtained recording layer and further a protective film 71 is formed on the high-reflection film 70, thereby making it possible to manufacture a thin optical disk having a multilayer structure.

In this case, if the number of recording layers is N, a thickness of the finally obtained optical disk is a sum of a thickness obtained by multiplying a thickness of the ultraviolet curing resin layer between layers with N and a total thickness of the high-reflection film 70 and the protective film 71, e.g., 5 µm. Specifically, if the thickness of the ultraviolet curing resin layer between layers is 20 µm, the total thickness of the high-reflection film 70 and the protective film 71 is 5 µm and the optical disk has four-layer structure, then the thickness of the whole optical disk becomes 185 µm.

However, since the optical disk thus obtained has very low rigidity, it is necessary that rigid thick plates are bonded to the side of the thin plate substrate 43 to support them or that the information is recorded and reproduced by utilizing a phenomenon in which a flexible optical disk becomes flat when being rotated at high speed.

A value of 20 µm which is a thickness between the adjacent recording layers described above is determined based on the number of layers of the optical disk finally obtained and a movable distance of a lens of a pickup for recording and reproducing the optical disk.

Figure 18:
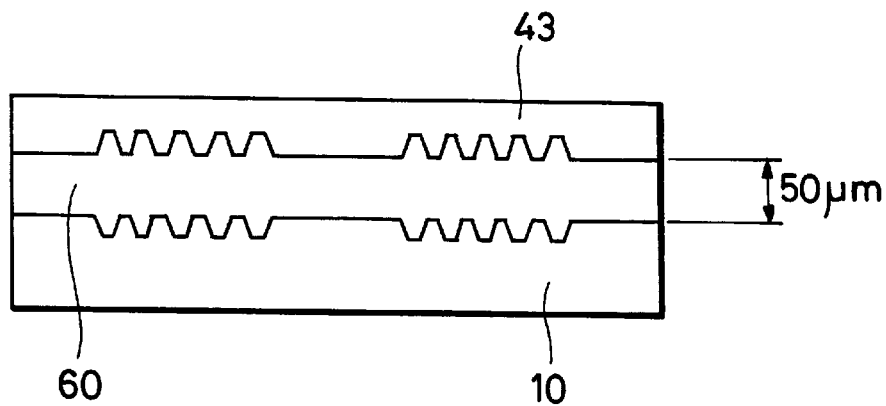
FIG. 18 is a schematic, cross-sectional view showing an example of an optical recording medium having a dilayer structure according to the present invention.
Figure 19:
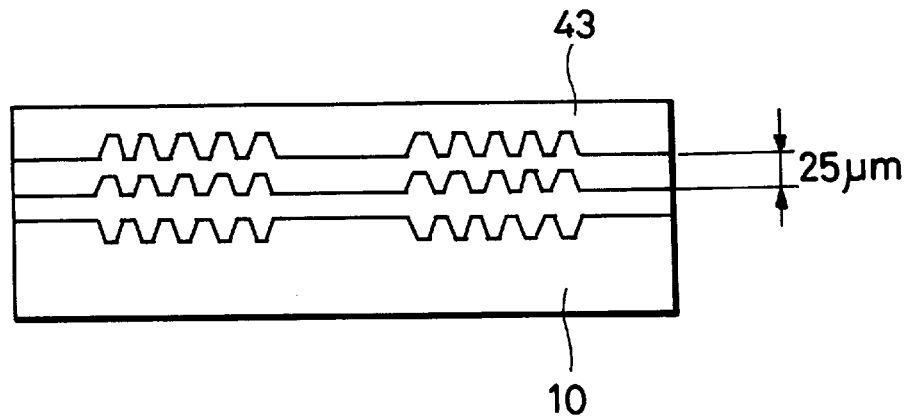
FIG. 19 is a schematic, cross-sectional view showing an example of an optical recording medium having a trilayer structure according to the present invention.

If the movable distance of the lens, i.e., an interval of a two-group lens is 50 µm, as shown in FIG. 18, it is sufficient to bond the substrate 10 and the thin plate substrate 43 to each other through the ultraviolet curing resin at an interval of 50 µm. If the optical disk having a trilayer structure shown in FIG. 19 is manufactured, it is sufficient to form the recording layers between the substrate 10 and the thin plate substrate 43 at an interval of 25 µm.

Figure 20:
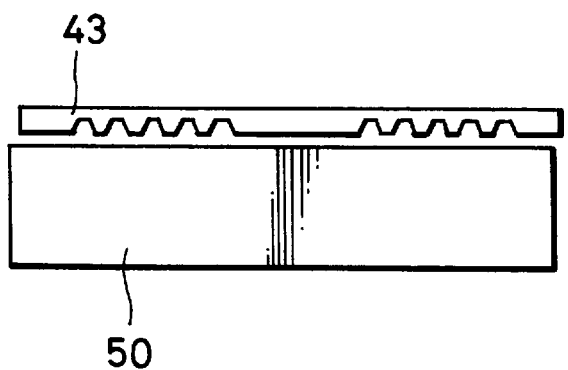
FIG. 20 is a schematic, cross-sectional view showing another example of an optical recording medium according to the present invention.

Other than the optical disks having the above structures, the present invention can be applied to an optical disk formed by pressing the thin plate substrate 43 and a disk-shaped substrate 50 manufactured by injection molding and having a thickness of 1.1 mm to each other through ultraviolet curing resin as shown in FIG. 20 and bonding them to each other by irradiation of ultraviolet rays from the transparent substrate side.

Figure 21:
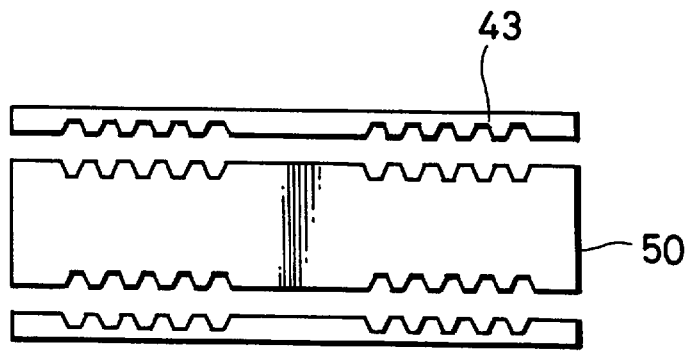
FIG. 21 is a schematic, cross-sectional view showing another example of an optical recording medium according to the present invention.

According to the present invention, as shown in FIG. 21, the optical disk finally having a four-layer structure can be manufactured by placing thin plate substrates 43 on a substrate 50 having minute concaves and convexes as recording layers formed on both sides thereof by injection molding to press the thin plate substrates 43 to the substrate 50 through ultraviolet curing resin and then bonding the thin plate substrates 43 to the substrate 50 by irradiation of ultraviolet rays from the side of the thin plate substrate 43.

A pit or depth formed on the substrate will be described. Hereinafter, it is assumed that the refractivity of the light transmissive layer is N.

A depth of a pit or a groove in which the highest modulation can be obtained is $(\lambda/4)/N$. A depth of a pit or a groove in the optical recording medium or ROM type and the like is set to the above value.

If in the groove recording or the land recording a tracking error signal is obtained by a push-pull operation, a push-pull signal becomes maximum when the depth of the pit or the groove is $(\lambda/8)/N$.

Moreover, if a signal is recorded on both of the land and the groove, then the groove depth must be set together with characteristics of a servo signal in consideration of the crosstalk and cross-erasure characteristics. From study of experimental results, it is confirmed that the crosstalk becomes minimum when the groove depth is in the vicinity of a value of $(\lambda/6)/N$ or $(\lambda/3)/N$ and the cross-erasure gives less influence as the groove is deeper. If both of the crosstalk and cross-erasure characteristics are satisfied in consideration of a groove inclination and the like, both of the characteristics become optimum when the depth is in the vicinity of a value of $(3/8\lambda)/N$. The high-recording-density optical recording medium according to the present invention can be applied to an optical recording medium having a groove depth in the above range.

Figure 22:
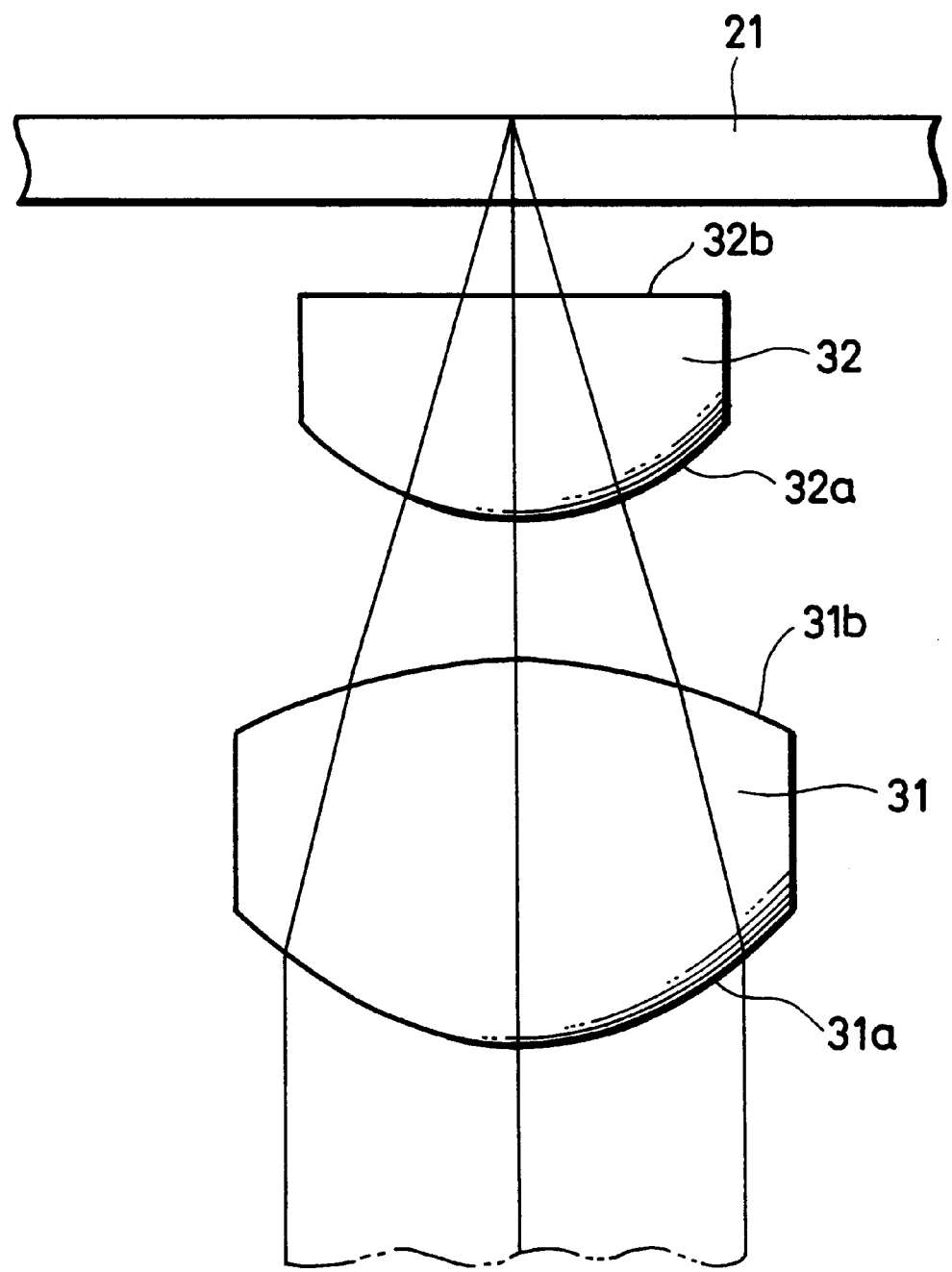
FIG. 22 is an enlarged diagram of a tow-group lens used in an optical system for recording and reproducing an optical disk to which the present invention si applied.

An arrangement for realizing a higher N.A. will be described. FIG. 22 shows an arrangement of lenses of an optical disk apparatus for realizing a higher N.A., i.e., an arrangement of a two-group lens thereof.

As shown in FIG. 22, the optical disk apparatus has a second lens 32 provided between a first lens 31 and a disk 21.

Since the optical disk apparatus has an arrangement of the two-element lens, it is possible to set the N.A. to 0.7 or larger, and it is also possible to narrow an interval (W.D.) between a first plane 32a of the second lens 32 and a surface of the disk 21.

It is desirable to form a first plane 31a, a second plane 31b, a third plane 32a and a fourth plane 32b of the first and second lenses 31 and 32 as aspherical planes.

Since the two-element lens is employed, it is possible to record and reproduce the above optical recording medium with high recording density.

As clearly described above, according to the present invention, an optical recording medium includes a base layer having an information signal portion formed on a surface on the side on which laser light is incident, and a light transmissive layer formed on the base layer. A thickness t of the light transmissive layer is within the range of t=3 to 177 µm at least in an area of the information signal portion. If unevenness of the light transmissive layer is Δt, N.A. of an optical system for reproduction or recording and reproduction and a wavelength $\lambda$ satisfies $\Delta t \leq \pm 5.26 \, (\lambda/\text{N.A.}^4) \, (\mu m)$. A track pitch is P and a skew is Θ, then $P \leq 0.64$ µm and $\Theta \leq \pm 84.115° \, (\lambda/\text{N.A.}^3/t)$ are satisfied. The optical recording medium is recorded or reproduced by a recording and reproducing system satisfying $\lambda \leq 0.68$ µm and N.A./$\lambda \geq 1.20$. The optical recording medium permits a recording capacity of 8 GB. Therefore, it is possible to increase a storage capacity of an optical recording medium with a simple recording and reproducing apparatus.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An optical recording medium comprising:
    a base layer having an information signal portion formed on a surface on the side on which laser light is incident; and
    a light transmissive layer formed on said base layer, wherein a thickness t of said light transmissive layer is within the range of t=3 to 177 µm at least in an area of said information signal portion, and if unevenness of said light transmissive layer is $\Delta t$, N.A. of an optical system for reproduction or recording and reproduction and a wavelength $\lambda$ satisfies $\Delta t \leq \pm 5.26 \, (\lambda/N.A.^4) \, (\mu m)$ (where N.A. is a numerical aperture).

2. An optical recording medium according to claim 1, wherein if a track pitch is P and a skew is $\Theta$, then $P \leq 0.64$ $\mu m$ and $\Theta \leq \pm 84.115° \, (\lambda/N.A.^3/t)$ are satisfied.

3. An optical recording medium according to claim 1, wherein said optical recording medium is recorded or reproduced by a recording and reproducing system satisfying $\lambda \leq 0.68 \, \mu m$ and $N.A./\lambda \geq 1.20$.

4. An optical recording medium according to claim 1, wherein its outer diameter is at most 127 mm and its thickness is at most 1.60 mm.

5. An optical recording medium according to claim 1, wherein a linear density is set so that a recording capacity should be at least 8 GB.

6. An optical recording medium according to claim 1, wherein if refractivity of said light transmissive layer is N, then a depth of a groove or an information pit is within the range from $(\lambda/8)/N$ to $(3\lambda/8)/N$.

7. An optical recording medium according to claim 1, wherein a track pitch unevenness is set as $AP \leq 67.57 \, P \, (\mu m)$, and a skew is set to at most 0.4°.

8. An optical recording medium according to claim 1, wherein a surface roughness RA, in a range of a spot size, of a surface irradiated with a recording and reproduction beam is set to at most $\pm 3\lambda/100$.

9. An optical recording medium according to claim 1, further comprising:
   a substrate made of thermoplastic resin and having a thickness of 0.3 to 1.2 mm; and
   a guide groove formed on said substrate by transferring, wherein a multilayer film is formed on said guide groove or an organic pigment is formed thereon by spin coating, and ultraviolet curing resin of at least one kind is coated thereon so as to have a thickness of 3 to 177 $\mu m$.

10. An optical recording medium according to claim 1, further comprising:
    a substrate made of thermoplastic resin and having a thickness of 0.3 to 1.2 mm; and
    a guide groove formed on said substrate by transferring, wherein a multilayer film is formed on said guide groove or an organic pigment is formed thereon by spin coating, a light transmissive film serving as a light transmissive layer is bonded thereonto through ultraviolet curing resin of at least one kind is coated thereon, and a total thickness is within the range from 3 to 177 $\mu m$.

11. An optical recording medium according to claim 1, wherein said light transmissive layer is formed by heating a sheet manufactured by injection molding or casting to high temperature by a stamper to thereby transfer a signal or a guide groove to said sheet.

12. An optical recording medium according to claim 11, wherein a base substrate having a thickness of 0.6 to 1.2 mm is bonded to said transfer sheet.

13. An optical recording medium according to claim 12, wherein said base substrate is a transparent plate.

14. An optical recording medium according to claim 12, wherein said base substrate is bonded through ultraviolet curing resin.

15. An optical recording medium according to claim 10, wherein said ultraviolet curing resin is coated by spin coating.

16. An optical recording medium according to claim 1, having a double-sided structure formed by simultaneous molding on both sides or bonding on both sides.

17. An optical recording medium according to claim 1, having a multilayer structure in which a plurality of information recording films or reflective films and light transmissive layers are laminated.

18. An optical recording medium according to claim 17, wherein reflectivities of said plurality of reflective films are reduced in a direction toward a light incidence side.

19. An optical recording medium according to claim 1, wherein ultraviolet curing resin is coated also on a side opposite to said light transmissive layer.

20. An optical recording medium according to claim 19, wherein ultraviolet curing resin coated on a side opposite to said light transmissive layer has high shrinkage ratio after curing as compared with a material forming said light transmissive layer.

21. An optical recording medium according to claim 1, wherein a hard coat for improving a surface hardness and antistatic property is formed on a surface of said light transmissive layer.

22. An optical recording medium according to claim 9 or claim 10, wherein a surface of an information recording layer to be coated with ultraviolet curing resin is subjected to silane processing for improving adhesion to said ultraviolet curing resin.

23. An optical recording medium according to claim 1, wherein an antireflection film is formed on a surface of said light transmissive layer.

24. An optical recording medium according to claim 23, wherein refractivity N of said antireflection film is lower than refractivity of said light transmissive layer and a thickness of said antireflection film is set to at most $(\lambda/3)/N$ (nm) if a wavelength of light used for recording and reproduction is $\lambda$.

25. An optical disk apparatus for recording an optical disk having a light transmissive layer whose thickness t is set as $t=3$ to 177 $\mu m$, comprising:
    a laser light source for laser light having a wavelength of at most 680 nm; and
    a lens having N.A. of at least 0.7 for converging laser light at a signal recording surface of said optical disk;
    wherein,
    if thickness unevenness of a light transmissive layer of said optical disk is $\Delta t$, N.A. of an optical system for recording or recording and reproducing said optical disk and a wavelength $\lambda$ satisfy $\Delta t \leq \pm 5.26 \, (\lambda/N.A.^4)$ ($\mu m$) (where N.A. is a numerical aperture.

26. An optical disk apparatus according to claim 25, wherein said lens has a two-group structure.

27. An optical disk apparatus according to claim 25, wherein said lens has N.A. of at least 0.78.

* * * * *